US012802717B2

(12) United States Patent
Morita

(10) Patent No.: US 12,802,717 B2
(45) Date of Patent: Nov. 17, 2026

(54) HARD DISK DEVICE WITH RAMP WITH MULTIPLE POSITIONS

(71) Applicants: Kabushiki Kaisha Toshiba, Tokyo (JP); Toshiba Electronic Devices & Storage Corporation, Tokyo (JP)

(72) Inventor: Masaki Morita, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/060,318

(22) Filed: Feb. 21, 2025

(65) Prior Publication Data

US 2026/0073939 A1 Mar. 12, 2026

(30) Foreign Application Priority Data

Sep. 6, 2024 (JP) ................................ 2024-154183

(51) Int. Cl.
*G11B 5/54* (2006.01)
*G11B 21/12* (2006.01)
*G11B 21/22* (2006.01)

(52) U.S. Cl.
CPC ................ *G11B 5/54* (2013.01); *G11B 21/12* (2013.01); *G11B 21/22* (2013.01)

(58) Field of Classification Search
None
See application file for complete search history.

(56) References Cited

U.S. PATENT DOCUMENTS 6,344,950 B1 2/2002 Watson et al.
6,369,988 B1 * 4/2002 Yoshida et al. .......... G11B 5/54 360/254.3
6,952,319 B2 * 10/2005 Weiehelt et al. .. G11B 5/59633 360/75
7,697,238 B2 4/2010 Makoto et al.
10,706,879 B2 * 7/2020 Garbarino ................ G11B 5/54
11,094,347 B1 * 8/2021 Herdendorf et al. .... G11B 5/54
11,100,952 B2 * 8/2021 Sueoka et al. ........... G11B 5/54
11,348,610 B1 * 5/2022 Herdendorf et al. .. G11B 21/22
11,545,181 B2 1/2023 Herdendorf et al.
2010/0271733 A1 * 10/2010 Kim ......................... G11B 5/54 360/236.6
2011/0038074 A1 2/2011 Viskochil et al.

* cited by examiner

*Primary Examiner* — Craig A. Renner
(74) *Attorney, Agent, or Firm* — Kim & Stewart LLP

(57) ABSTRACT

According to one embodiment, a disk device includes a magnetic disk, a ramp, a head stack assembly (HSA), and a housing. The ramp is rotatable between a first position covering a portion of the magnetic disk and a second position separated from the magnetic disk. The HSA is rotatable to a load position, an unload position, and a retracted position at which the HSA is separated from the magnetic disk. The ramp includes a first support portion that supports the lift tab when moving between the load position and the unload position at the first position, and a second support portion that supports the lift tab when moving between the unload position and the retracted position at the second position. The housing includes a first abutment portion that abuts the ramp at the first position to restrict rotation of the ramp.

17 Claims, 7 Drawing Sheets

HARD DISK DEVICE WITH RAMP WITH MULTIPLE POSITIONS

CROSS-REFERENCE TO RELATED APPLICATION(S)

This application is based upon and claims the benefit of priority from Japanese Patent Application No. 2024-154183, filed Sep. 6, 2024, the entire contents of which are incorporated herein by reference.

FIELD

Embodiments described herein relate generally to a disk device.

BACKGROUND

A disk device such as a hard disk drive (HDD) includes, for example, a magnetic disk, a head stack assembly (HSA), a ramp, and a housing. The HSA moves between a load position where a slider of the HSA is positioned on the surface of the magnetic disk and an unload position where the HSA is held by a ramp.

DETAILED DESCRIPTION

Embodiments provide a disk device in which a magnetic disk can be removed without removing a ramp and an HSA from a housing.

In general, according to one embodiment, a disk device includes a magnetic disk, a ramp, a head stack assembly (HSA), and a housing. The ramp is rotatable between a first position at which the ramp is covering at least a portion of the magnetic disk and a second position at which the ramp is separated from the magnetic disk. The HSA is rotatable to a load position, an unload position, and a retracted position at which the HSA is separated from the magnetic disk. The ramp includes a first support portion that supports the lift tab when moving between the load position and the unload position at the first position, and a second support portion that supports the lift tab when moving between the unload position and the retracted position at the second position. The housing includes a first abutment portion that abuts the ramp at the first position to restrict rotation of the ramp.

Hereinafter, certain example embodiments according to the present disclosure will be described with reference to the drawings.

The drawings are schematic and conceptual, as such depicted relationships between component dimensions, such as thicknesses and widths and the ratios between sizes of the components are not necessarily exactly the same as in an actual device. In addition, the dimensions and ratios of the same component may be differently illustrated from drawing to drawing.

First Embodiment

A first embodiment will be described below with reference to FIGS. 1 to 6. In the present specification, the constituent elements according to the embodiments and the description of the elements may be described by a plurality of expressions. The components and the description thereof are examples and are not limited by the specific expressions used in the present specification. Components may also be identified by names different from those herein. Further, the components may be described by expressions different from those in the present specification.

In the following description, "prevent" refers to suppressing occurrences of an event, action, or effect or reducing the extent of an event, action, or effect. In the following description, "restrict" refers preventing movement or rotation or limiting movement or rotation to within a predetermined range and/or preventing movement or rotation beyond the predetermined range.

Figure 1:
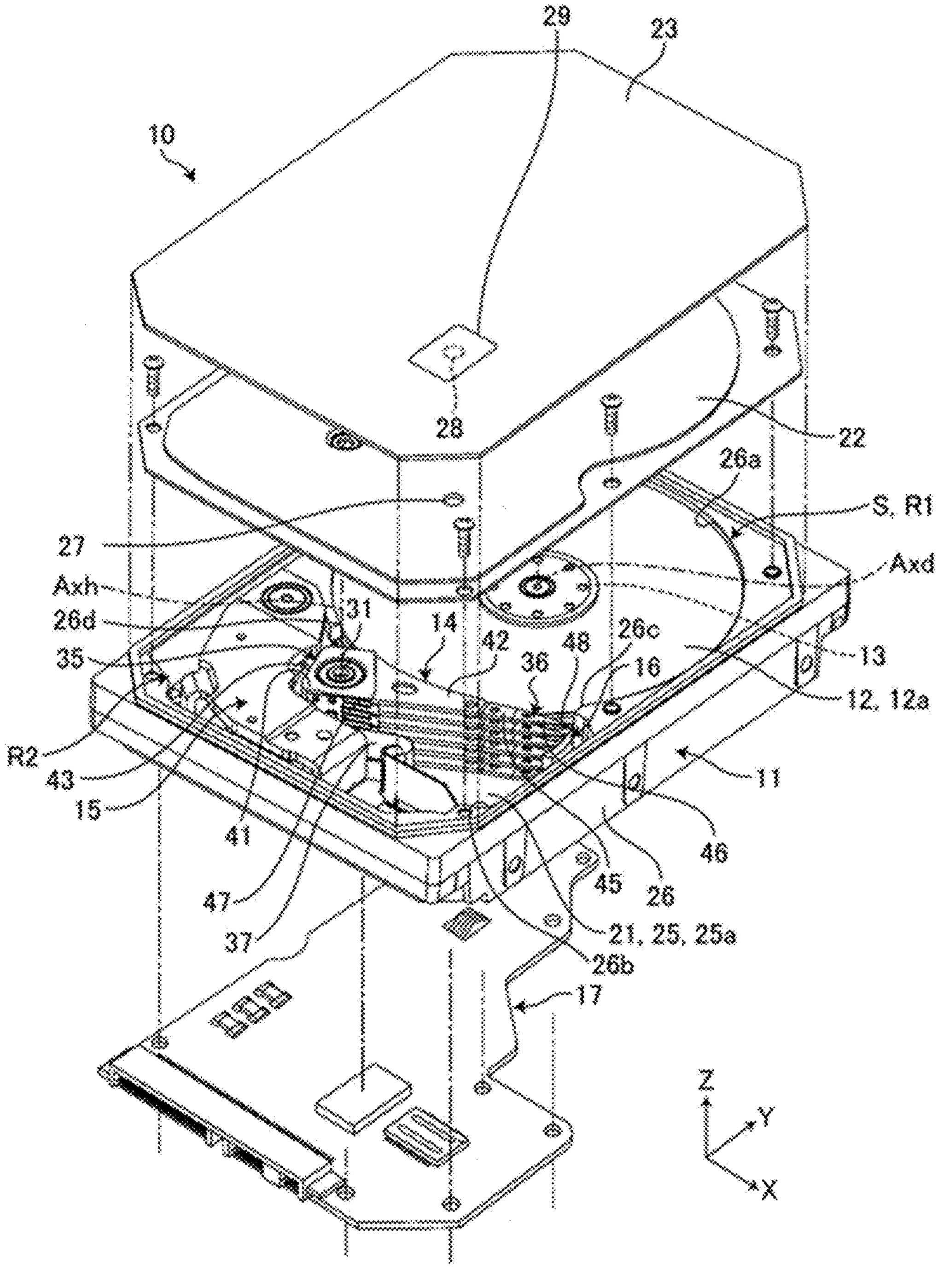
FIG. 1 is an exemplary exploded view of an HDD according to a first embodiment.

FIG. 1 is an exemplary exploded perspective view of a hard disk drive (HDD) 10 according to the first embodiment. The HDD 10 is an example of a disk device and may also be referred to as an electronic device, a storage device, an external storage device, or a magnetic disk device. The HDD 10 of the present embodiment is a 3.5 inch HDD. The HDD 10 in other examples may be another HDD type such as a 2.5 inch HDD.

As shown in the drawings, an X axis, a Y axis, and a Z axis are defined for convenience in the present specification. The X axis, the Y axis, and the Z axis are orthogonal to each other. The X-axis is provided along the width of the HDD 10. The Y-axis is provided along the length of the HDD 10. The Z-axis is provided along the depth/thickness of the side HDD 10.

Further, in the present specification, an X direction, a Y direction, and a Z direction are defined. The X direction is a direction along the X axis and includes a +X direction indicated by an arrow of the X axis and a −X direction opposite to the arrow of the X axis. The Y direction is a direction along the Y axis and includes a +Y direction indicated by an arrow of the Y axis and a −Y direction opposite to the arrow of the Y axis. The Z direction is a direction along the Z axis and includes a +Z direction indicated by an arrow of the Z axis and a −Z direction opposite to the arrow of the Z axis.

As shown in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. The magnetic disk 12 may also be referred to as a disk, a medium, or a platter. The ramp load mechanism 16 is an example of a ramp.

An internal space S is provided in the housing 11. The housing 11 houses the plurality of magnetic disks 12, the spindle motor 13, the HSA 14, the VCM 15, and the ramp load mechanism 16 in the internal space S.

The internal space S includes a first room R1 and a second room R2. The first room R1 is a substantially cylindrical space extending in the Z direction. The second room R2 is a space having a substantially rectangular parallelepiped shape. An end portion of the first room R1 in the −Y direction and an end portion of the second room R2 in the +Y direction connect with each other.

A plurality of magnetic disks 12 and a spindle motor 13 are disposed in the first room R1. A HSA 14, a VCM 15, and a ramp load mechanism 16 are arranged in the second room R2. A part of the magnetic disk 12 may be located in the second room R2, or a part of the HSA 14 may be located in the first room R1.

The housing 11 comprises a base 21, an inner cover 22, and an outer cover 23. The base 21, the inner cover 22, and the outer cover 23 are made of, for example, metal. The housing 11 is not limited to this configuration or material example.

The base 21 is formed in a substantially rectangular parallelepiped box shape opened in the +Z direction. The base 21 has a bottom wall 25 and a side wall 26. The bottom wall 25 is formed in a substantially rectangular (quadrangular) plate shape. The bottom wall 25 has a bottom surface 25*a*. The bottom surface 25*a* faces substantially in the +Z direction as a whole. The bottom surface 25*a* is a part of the inner surface of the housing 11 that defines the internal space S. The side wall 26 protrudes from the edge of the bottom wall 25 substantially in the +Z direction and is formed in a substantially rectangular frame shape. The internal space S is provided inside the frame-shaped side wall 26.

The inner cover 22 is attached to the side wall 26 by, for example, a screw, and closes the internal space S. The outer cover 23 covers the inner cover 22 and is attached to an end portion of the side wall 26 in the +Z direction by, for example, welding.

The internal space S may be filled with a gas different from air. For example, the internal space S is filled with a gas through the vent hole 27 of the inner cover 22 and the vent hole 28 of the outer cover 23, and the vent hole 28 is sealed by the seal 29.

The gas filled in the internal space S is, for example, a low-density gas having a density lower than that of ambient air, an inert gas having low reactivity, or the like. For example, helium is filled in the internal space S. Note that the internal space S may be filled with another gas or fluid.

The magnetic disk 12 is formed in a disk shape arranged to intersect with the Z direction. The plurality of magnetic disks 12 are arranged at intervals in the Z direction. The magnetic disks 12 are held on a hub of the spindle motor 13 by, for example, a clamp spring. The spindle motor 13 rotates the magnetic disks 12 around the central axis Axd. The central axis Axd is an example of a first rotation axis.

The central axis Axd can be considered as a virtual central axis of rotation of the magnetic disk 12 and extends substantially in the Z direction. The central axis Axd corresponds to the central axis of the magnetic disk 12 and the central axis of the spindle motor 13. The central axis Axd arrangement and positioning is not limited to this example.

In the present specification, an axial direction, a radial direction, and a circumferential direction are defined for a plurality of central axes including the central axis Axd. The axial direction is a direction along or parallel to the central axis. The axial direction in the present embodiment is equal to the Z direction. The radial direction is a direction orthogonal to the central axis. The circumferential direction is a direction going around the central axis.

Figure 2:
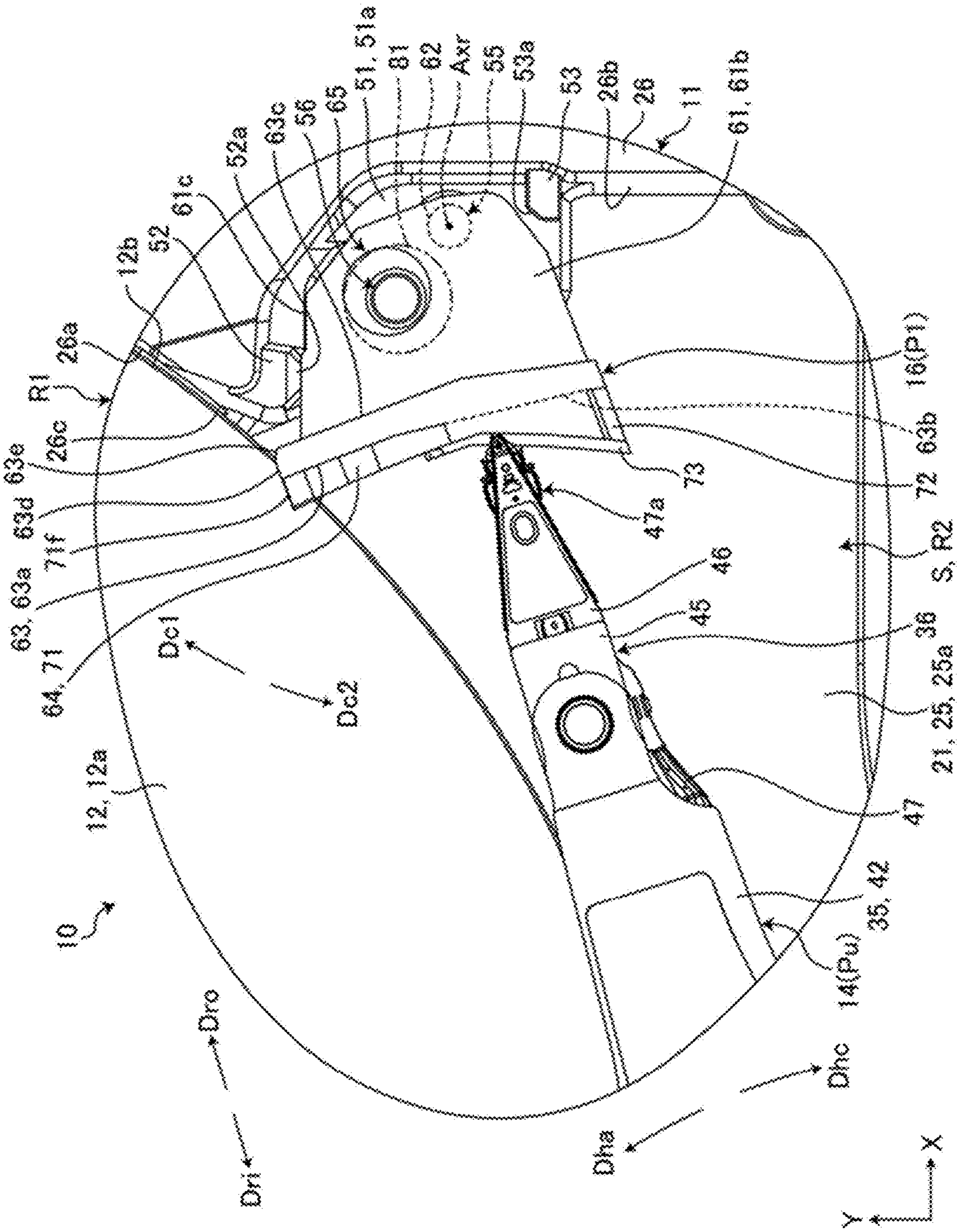
FIG. 2 is an exemplary plan view showing a part of a HDD according to a first embodiment.

FIG. 2 is an exemplary plan view showing a part of the HDD 10 of the first embodiment. As shown in FIG. 2, each of the plurality of magnetic disks 12 has a surface 12*a* and an outer edge 12*b*. Each magnetic disk 12 has two surfaces 12*a*.

Each of the two surfaces 12*a* is formed substantially flat. The one surface 12*a* faces substantially in the +Z direction. The other surface 12*a* faces substantially in the −Z direction. The outer edge 12*b* is an end of the magnetic disk 12 in the radial direction from the center axis Axd and extends circularly around the central axis Axd.

As shown in FIG. 1, the housing 11 further includes a support shaft 31. The support shaft 31 is spaced apart from the magnetic disks 12 in the radial direction from the central axis Axd, and extends, for example, substantially in the +Z direction from the bottom surface 25*a* of the bottom wall 25. The HSA 14 is supported by the support shaft 31 so as to be rotatable around the central axis Axh. The central axis Axh is an example of a third rotation axis.

The central axis Axh is a virtual center axis of rotation of the HSA 14 and extends substantially in the Z direction. That is, the central axis Axh extends substantially parallel to the central axis Axd. The central axis Axh is the central axis of the support shaft 31. The central axis Axh is not limited to this example.

The circumferential direction about the central axis Axh includes a clockwise direction Dhc and a counterclockwise direction Dha as shown in FIG. 2. The clockwise direction Dhc is a clockwise direction around the central axis Axh in a projected view of the bottom surface 25*a* as viewed in the −Z direction as in FIG. 2. The counterclockwise direction Dha is a counterclockwise direction around the central axis Axh in a projected view of the bottom surface 25*a* viewed in the −Z direction. That is, the counterclockwise direction Dha is a direction opposite to the clockwise direction Dhc.

As shown in FIG. 1, the HSA 14 includes a carriage 35, a plurality of head gimbal assemblies (HGA) 36, and a flexible printed circuit board (FPC) 37. The carriage 35 includes an actuator block 41, a plurality of arms 42, and a coil holder 43.

The actuator block 41 is supported by the support shaft 31 via a bearing so as to be rotatable around the central axis Axh. Each of the plurality of arms 42 and the coil holder 43 protrudes from the actuator block 41 in the radial direction from the central axis Axh.

The plurality of arms 42 extend substantially in parallel from the actuator block 41. The plurality of arms 42 are arranged at intervals in the Z direction. Each of the plurality of arms 42 can enter a gap between two adjacent magnetic disks 12 among the plurality of magnetic disks 12. The coil holder 43 is located on the opposite side of the arm 42.

The VCM 15 includes a voice coil attached to the coil holder 43, a pair of yokes, and magnets provided on the yokes. The VCM 15 rotates the carriage 35 around the central axis Axh.

Figure 3:
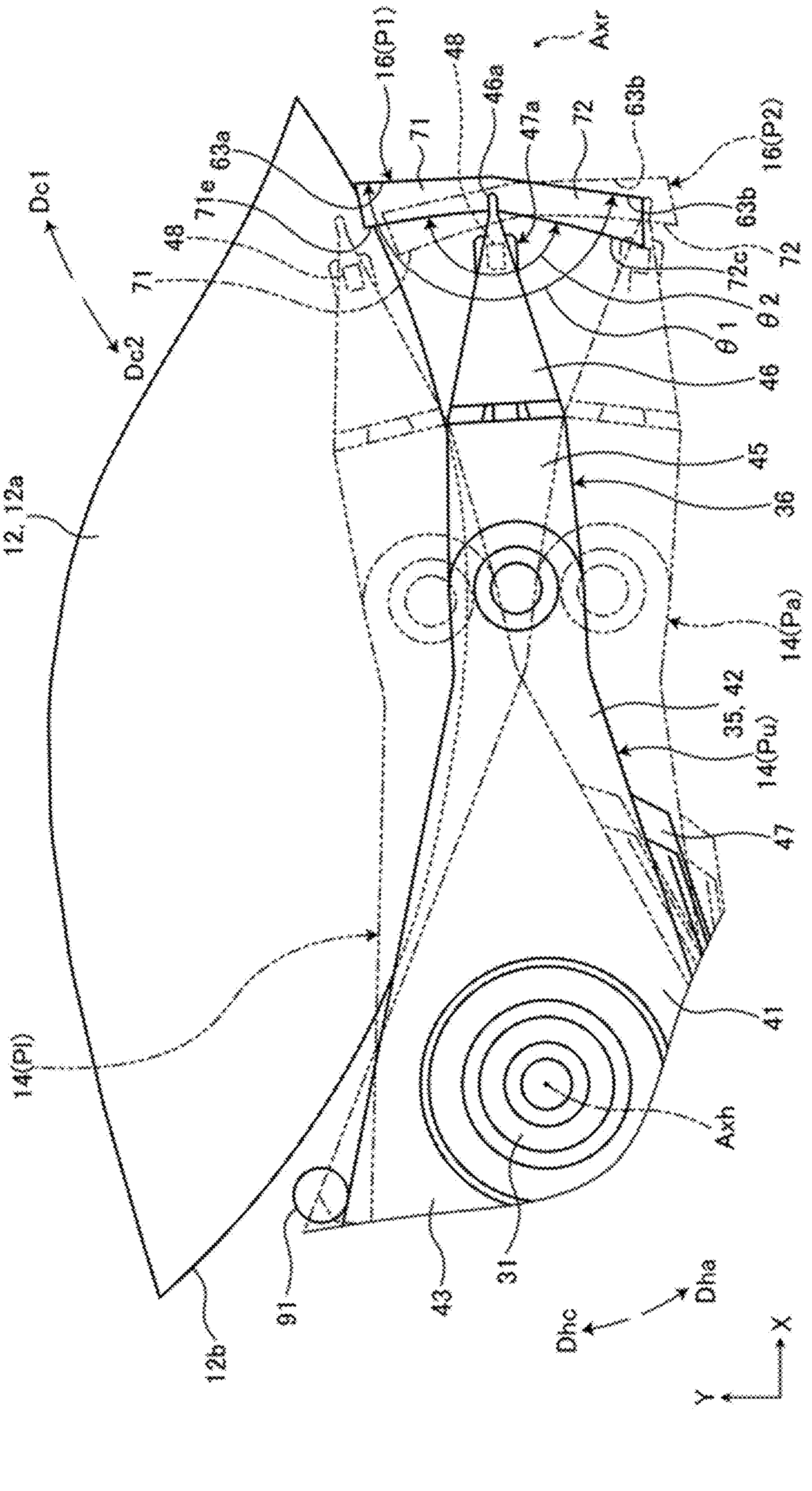
FIG. 3 is an exemplary plan view schematically showing a magnetic disk, a HSA, and a ramp load mechanism according to a first embodiment.

FIG. 3 is an exemplary plan view schematically showing the magnetic disks 12, the HSA 14, and the ramp load mechanism 16 of the first embodiment. As shown in FIG. 3, each of the plurality of HGA 36 includes a base plate 45, a load beam 46, a flexure 47, and a slider 48.

The base plate 45 is attached to an end portion of the arm 42 on the radially outer side of the central axis Axh. The load beam 46 is formed thinner than the base plate 45 and is attached to the base plate 45. The load beam 46 extends outward from the base plate 45 in the radial direction from the central axis Axh.

The load beam 46 has a lift tab 46*a*. The lift tab 46*a* is provided at an end of the load beam 46 on the outer side in the radial direction from the central axis Axh.
The lift tab 46*a* is located at an end of the HSA 14 on the radially outer side. Therefore, the lift tab 46*a* is more distant from the central axis Axh than the slider 48. The lift tab 46*a* is formed in, for example, a substantially boat shape.

The flexure 47 is formed in a long and narrow band shape. The shape of the flexure 47 is not limited to this particular example. The flexure 47 may be a kind of flexible printed circuit (FPC) board including a metal plate (backing layer) made of stainless steel or the like, an insulating layer (base layer) formed on the metal plate, a conductive layer formed on the insulating layer and constituting a plurality of wirings (wiring pattern), and an insulating layer (cover layer) covering the conductive layer.

A gimbal 47*a* (elastic support portion) is provided at an end portion of the flexure 47 on the outer side in the radial direction from the central axis Axh. The gimbal 47*a* is positioned on the load beam 46 and is formed to be rotatable with respect to the load beam 46. The slider 48 is mounted on the gimbal 47*a*.

The slider 48 has a head element for recording and reproducing information on and from the recording layer of the magnetic disk 12. In other words, the slider 48 reads and writes information from and to the magnetic disk 12.

The VCM 15 rotates the HSA 14 around the central axis Axh. As shown in FIG. 3, the HSA 14 can be moved to a load position Pl and an unload position Pu around the central axis Axh.

At the load position Pl, the slider 48 is positioned above the surface 12*a* of the magnetic disk 12. At the load position Pl, the HGA 36 and the arm 42 overlap the magnetic disks 12 in the axial direction and cover a part of the magnetic disks 12 in the axial direction.

At the unload position Pu, the slider 48 is separated from the magnetic disk 12, and the HGA 36 is held by the ramp load mechanism 16. On the other hand, at the unload position Pu, a part of the HSA 14 such as the arm 42 overlaps the magnetic disk 12 in the axial direction and covers a part of the magnetic disk 12 in the axial direction.

The FPC 37 shown in FIG. 1 is connected to an end portion of the flexure 47 on the radially inner side. For example, a plurality of flexures 47 are connected to the FPC 37. Thus, the FPC 37 is electrically connected to the sliders 48 via the wiring of the flexures 47.

The side PCB 17 is disposed outside the housing 11 and is attached to the bottom wall 25 of the base 21. Various components such as an interface (I/F) connector, a controller, and a relay connector are mounted on the PCB 17. The PCB 17 is electrically connected to the FPC 37 through a relay connector provided on the bottom wall 25, for example.

As shown in FIG. 2, the side wall 26 of the housing 11 has an inner peripheral surface 26*a* and an inner side surface 26*b*. The inner peripheral surface 26*a* defines first room R1. The inner side surface 26*b* defines second room R2.

The inner peripheral surface 26*a* is a substantially cylindrical curved surface extending around the central axis Axd. The inner peripheral surface 26*a* faces the outer edge 12*b* of the magnetic disk 12 with a clearance therebetween. The inner peripheral surface 26*a* surrounds the magnetic disks 12 and the spindle motor 13. The clearance between the inner peripheral surface 26*a* and the outer edge 12*b* is substantially constant.

As shown in FIG. 1, the inner side surface 26*b* is connected to two ends 26*c* and 26*d* of the inner peripheral surface 26*a*. The end 26*c* is an end of the inner peripheral surface 26*a* in the clockwise direction in a projected view of the bottom surface 25*a* viewed in the −Z direction. The end 26*d* is an end of the inner peripheral surface 26*a* in the counterclockwise direction in a projected view of the bottom surface 25*a* viewed in the −Z direction. The inner side surface 26*b* surrounds the HSA 14, the VCM 15, and the ramp load mechanism 16.

As shown in FIG. 2, the base 21 further includes a base 51, a first protruding portion 52, and a second protruding portion 53. The base 51, the first protruding portion 52, and the second protruding portion 53 are located near the end 26*c* of the inner peripheral surface 26*a* of the second room R2.

The base 51 protrudes from the bottom surface 25*a* of the bottom wall 25. The base 51 is connected to the inner side surface 26*b*. The base 51 has a placement surface 51*a*. The placement surface 51*a* is formed to be substantially flat and faces the +Z direction. In the Z-direction, the placement surface 51*a* is positioned between the bottom surface 25*a* and the end of the side wall 26 in the +Z-direction. In other words, the base 51 is lower than the side wall 26.

The base 51 is provided with a mounting hole 55 and a screw hole 56. The mounting hole 55 and the screw hole 56 are spaced apart from each other in the placement surface 51*a*. The cross sections of the mounting hole 55 and the screw hole 56 are formed in a substantially circular shape. The screw hole 56 can be provided with a female screw threading.

The first protruding portion 52 and the second protruding portion 53 project from the inner side surface 26*b* and are connected to the placement surface 51*a* of the base 51. The first protruding portion 52 and the second protruding portion 53 may be separated from the base 51. The first protruding portion 52 and the second protruding portion 53 are spaced apart from each other. The first protruding portion 52 is closer to the end 26*c* of the inner peripheral surface 26*a* and closer to the magnetic disk 12 than the second protruding portion 53.

The first protruding portion 52 has a first abutment surface 52*a*. The second protruding portion 53 has a second abutment surface 53*a*. The first abutment surface 52*a* and the second abutment surface 53*a* extend from the placement surface 51*a* substantially in the +Z direction and are formed substantially flat. The first abutment surface 52*a* is, for example, machined and has a lower roughness than the second abutment surface 53*a*. The configurations of the first abutment surface 52*a* and the second abutment surface 53*a* are not limited to this example.

Figure 4:
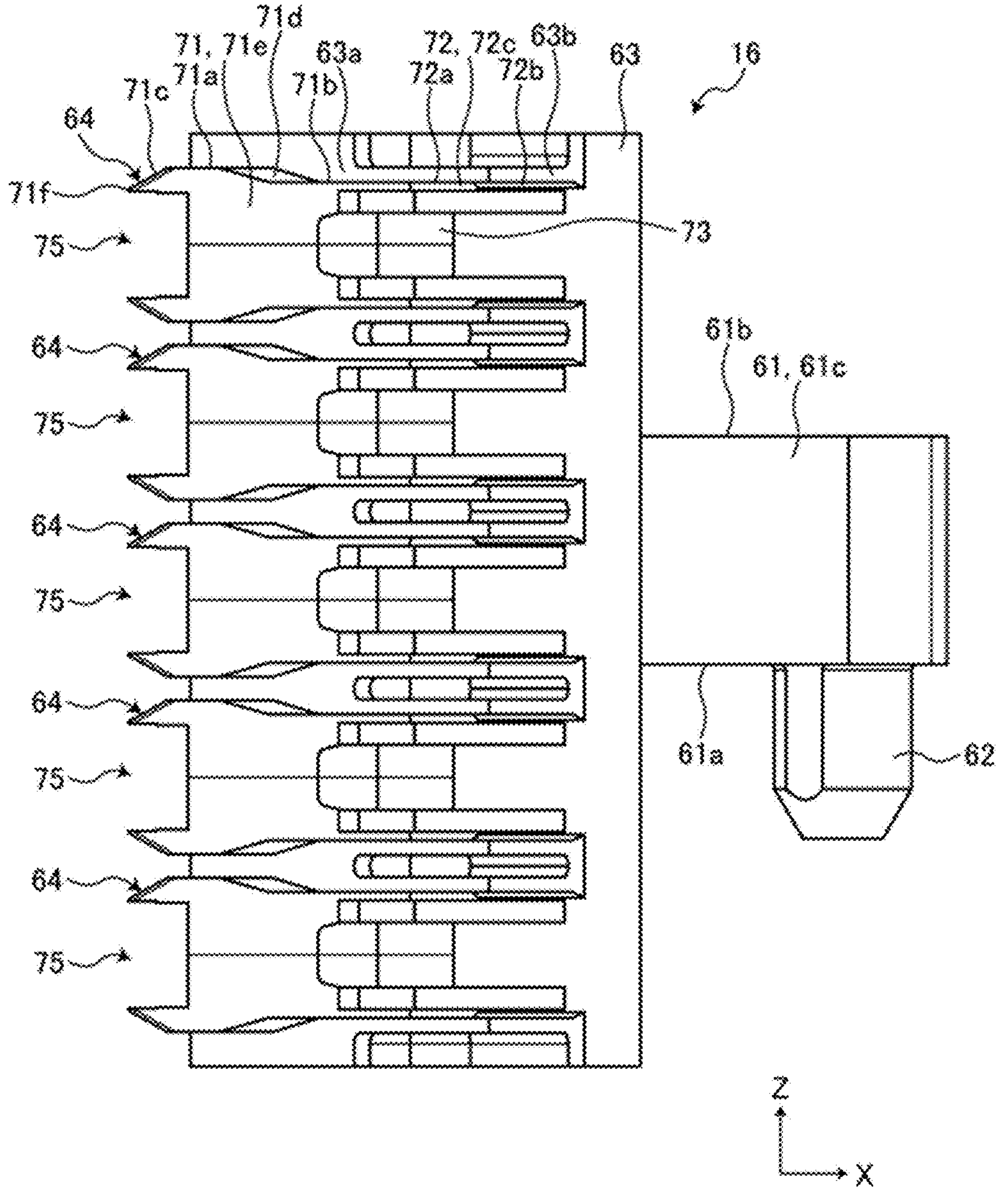
FIG. 4 is an exemplary side view showing a ramp load mechanism of a first embodiment.

FIG. 4 is an exemplary side view showing the ramp load mechanism 16 of the first embodiment. As shown in FIG. 4, the ramp load mechanism 16 includes a placement portion 61, a pin 62, a wall 63, and a plurality of protrusions 64.

The placement portion 61, the pin 62, the wall 63, and the plurality of protrusions 64 are formed integrally with each other, and are made of, for example, a synthetic resin. The placement portion 61, the pin 62, the wall 63, and the plurality of protrusions 64 may be different members or may be made of other materials.

The placement portion 61 is formed in a plate shape substantially orthogonal to the Z direction, for example. The placement portion 61 has a lower surface 61*a*, an upper surface 61*b*, and a side surface 61*c*. The lower surface 61*a* is formed to be substantially flat and faces the −Z direction. The lower surface 61*a* abuts on the placement surface 51*a* of the base 51 and is supported by the placement surface 51*a*. The upper surface 61*b* is located opposite to the lower surface 61$a$. The upper surface 61$b$ is formed substantially flat and faces the +Z direction. The side surface 61$c$ extends substantially in the Z direction between the edge of the lower surface 61$a$ and the edge of the upper surface 61$b$.

As shown in FIG. 2, a through hole 65 is provided in the placement portion 61. The through hole 65 penetrates the placement portion 61 in the Z direction and is an opening in the lower surface 61$a$ and the upper surface 61$b$. In the present embodiment, the cross section of the through hole 65 orthogonal to the Z direction is formed in a substantially circular shape. However, the cross section of the through hole 65 is not limited to this example and may be an oval shape or an arc shape in other examples.

As shown in FIG. 4, the pin 62 protrudes from the lower surface 61$a$ of the placement portion 61 substantially in the −Z direction. The pin 62 is formed in a substantially cylindrical shape extending in the Z direction. As shown in FIG. 2, the pin 62 can be fitted into the mounting hole 55 of the base 51. Thus, the ramp load mechanism 16 can be attached to the housing 11.

Figure 5:
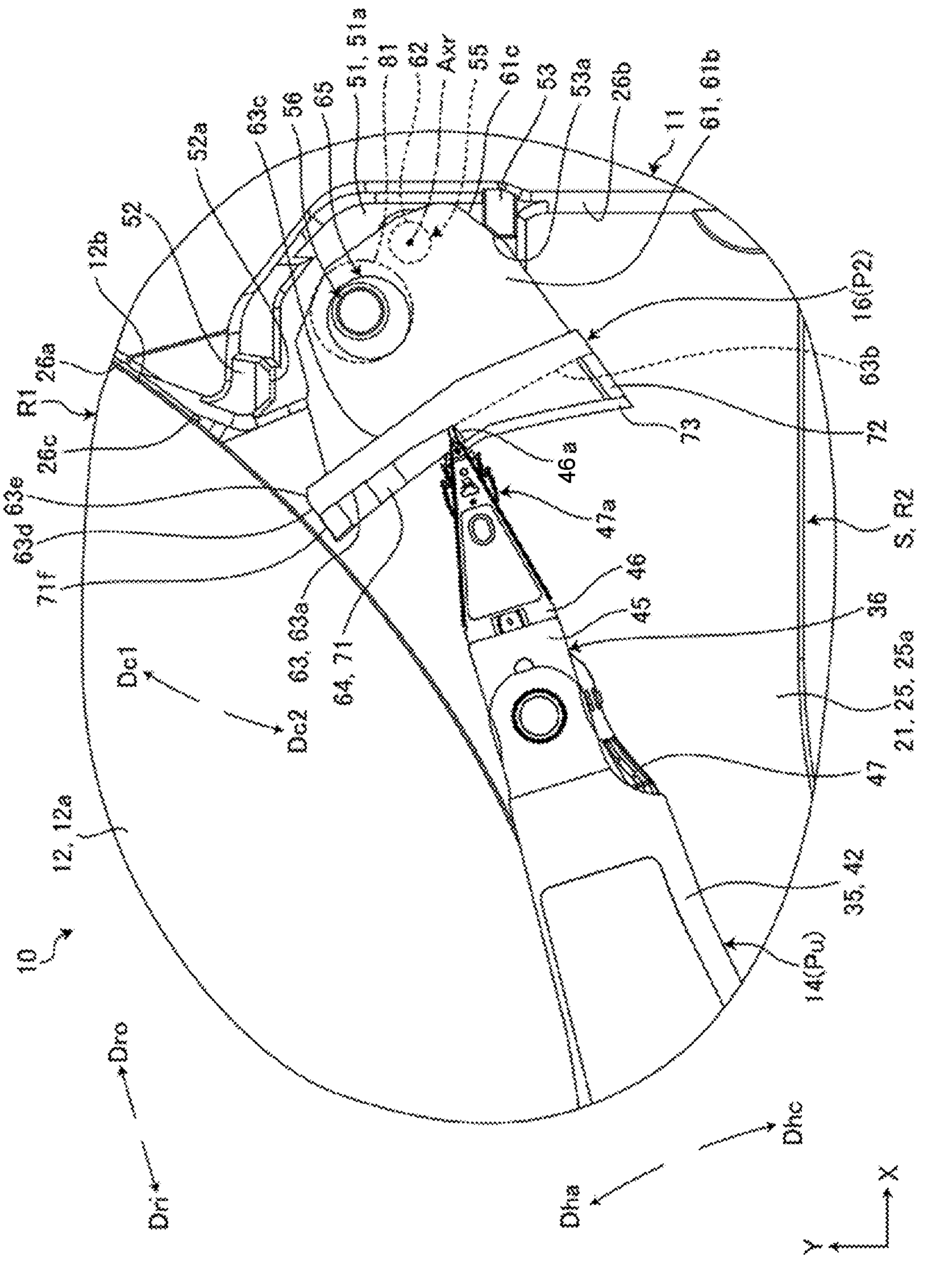
FIG. 5 is an exemplary plan view of a portion of a HDD with a ramp load mechanism of a first embodiment in a second position.

FIG. 5 is an exemplary plan view showing a part of the HDD 10 in which the ramp load mechanism 16 of the first embodiment is in the second position P2. The ramp load mechanism 16 is rotatable around the central shaft Axr between a first position P1 shown in FIG. 2 and a second position P2 shown in FIG. 5. The central axis Axr is an example of a second rotation axis.

The central axis Axr is a virtual central axis of rotation of the ramp load mechanism 16 and extends substantially in the Z direction. That is, the central axis Axr extends substantially parallel to the central axes Axd and Axh. The central axis Axr corresponds to a central axis of the attachment hole 55 and the pin 62. The positioning of the central axis Axr is not limited to this example.

The circumferential direction about the central axis Axr includes a first circumferential direction Dc1 and a second circumferential direction Dc2. The first circumferential direction Dc1 is a clockwise direction around the center shaft Axr in a projected view of the bottom surface 25$a$ viewed in the −Z direction as in FIG. 2. The second circumferential direction Dc2 is a counterclockwise direction around the center shaft Axr in a projected view of the bottom surface 25$a$ viewed in the −Z direction. That is, the second circumferential Dc2 is in the opposite direction of the first circumferential Dc1.

The first position P1 is spaced apart from the second position P2 in the first circumferential direction Dc1. That is, the ramp load mechanism 16 can move to the first position P1 by rotating from the second position P2 in the first circumferential direction Dc1.

When the ramp load mechanism 16 is at the first position P1, the side surface 61$c$ of the placement portion 61 abuts the first abutment surface 52$a$ and is spaced apart from the second protruding portion 53 in the first circumferential direction Dc1. The first abutment surface 52$a$ abuts the side surface 61$c$ to restrict the rotation of the ramp load mechanism 16 at the first position P1 in the first circumferential direction Dc1.

As shown in FIG. 5, when the ramp load mechanism 16 is at the second position P2, the side surface 61$c$ of the placement portion 61 abuts the second abutment surface 53$a$ and is spaced apart from the first protruding portion 52 in the second circumferential direction Dc2. The second abutment surface 53$a$ abuts the side surface 61$c$ to restrict the rotation of the ramp load mechanism 16 at the second position P2 in the second circumferential direction Dc2.

Figure 6:
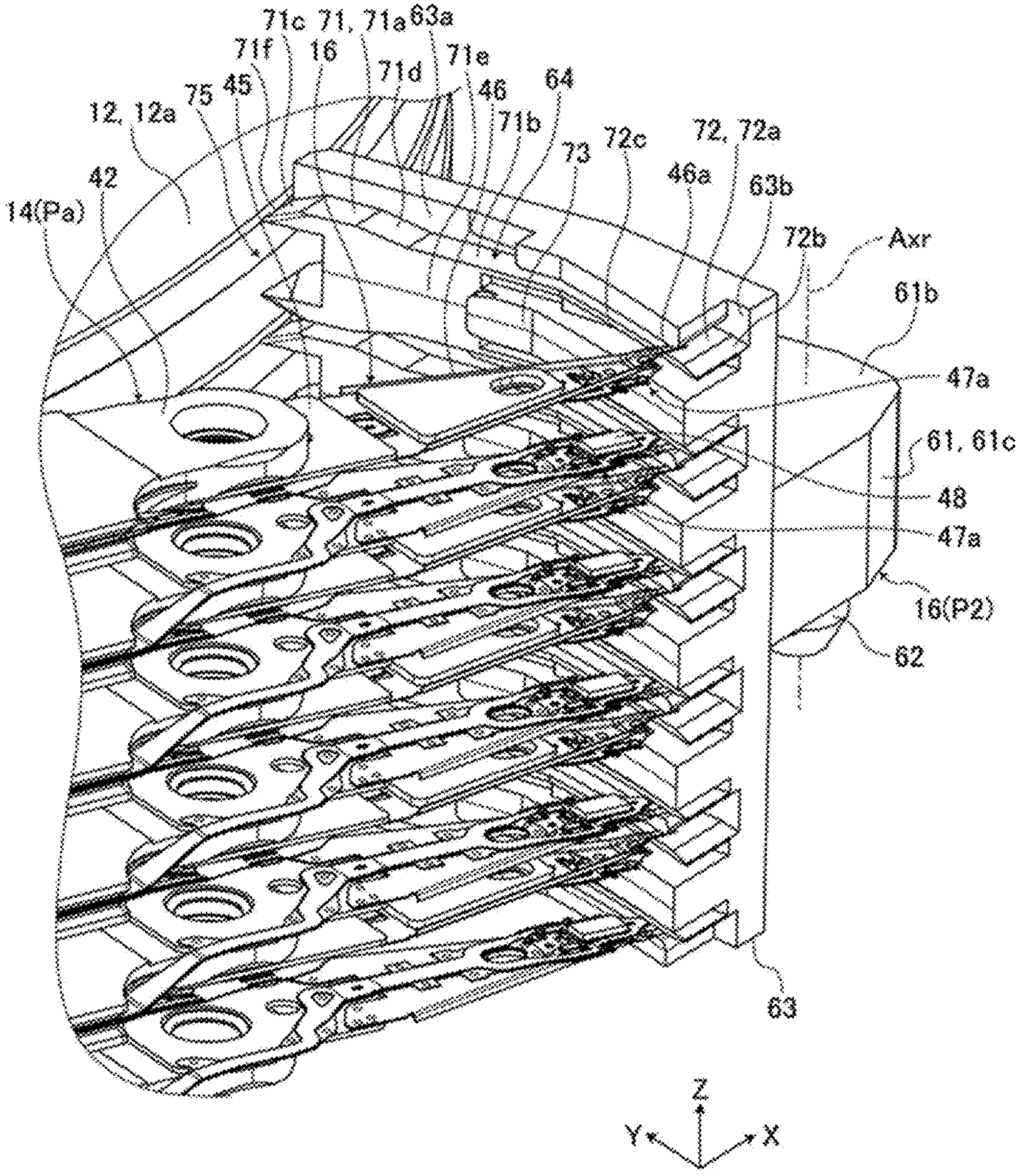
FIG. 6 is an exemplary perspective view showing a magnetic disk, a HSA, and a ramp load mechanism according to a first embodiment.

FIG. 6 is an exemplary perspective view showing the magnetic disks 12, the HSA 14, and the ramp load mechanism 16 according to the first embodiment. As shown in FIG. 6, the wall 63 is formed in a plate shape intersecting with the radial direction from the central axis Axr, for example. As shown in FIG. 2, the wall 63 has a first surface 63$a$, a second surface 63$b$, a back surface 63$c$, and a side surface 63$d$.

The first surface 63$a$ and the second surface 63$b$ are planes intersecting with the radial direction from the central axis Axr. The first surface 63$a$ and the second surface 63$b$ may be curved surfaces or may be uneven.

The first surface 63$a$ faces the central axis Axh of the HSA 14 when the ramp load mechanism 16 is at the first position P1. That is, the first surface 63$a$ is a plane substantially orthogonal to the radial direction from the central shaft Axr when the ramp load mechanism 16 is at the first position P1.

The first surface 63$a$ is spaced farther from the central axis Axh of the HSA 14 than the lift tab 46$a$ when the ramp load mechanism 16 is at the first position P1. That is, the first surface 63$a$ is located outside the range in which the HSA 14 rotates when the ramp load mechanism 16 is at the first position P1.

The second surface 63$b$ is farther from the central axes Axd of the magnetic disks 12 than the first surface 63$a$. An end of the first surface 63$a$ in the clockwise direction Dhc and an end of the second surface 63$b$ in the counterclockwise direction Dha are connected to each other. Another surface may be provided between the first surface 63$a$ and the second surface 63$b$.

The second surface 63$b$ is inclined with respect to the first surface 63$a$. As schematically shown in FIG. 3, an angle θ1 between the first surface 63$a$ and the second surface 63$b$ is larger than 90° and smaller than 180°. The angle θ1 is not limited to this example.

The second surface 63$b$ faces the central axis Axh of the HSA 14 when the ramp load mechanism 16 is at the second position P2. That is, the second surface 63$b$ is a plane substantially orthogonal to the radial direction from the central shaft Axr when the ramp load mechanism 16 is at the second position P2.

The second surface 63$b$ is spaced farther from the central axis Axh of the HSA 14 than the lift tab 46$a$ when the ramp load mechanism 16 is at the second position P2. That is, the second surface 63$b$ is located outside the range in which the HSA 14 rotates when the ramp load mechanism 16 is at the second position P2.

As shown in FIG. 2, the radial direction from the central axis Axh includes an inward direction Dri and an outward direction Dro. The inward direction Dri is the radially inner side of the central axis Axh. The outward direction Dro is outward in the radial direction from the central axis Axh. FIG. 2 illustrates an inward direction Dri and an outward direction Dro in one radial direction orthogonal to the central axis Axh. The first surface 63$a$ at the first position P1 and the second surface 63$b$ at the second position P2 face in the inward direction Dri.

The back surface 63$c$ is located opposite the first surface 63$a$ and the second surface 63$b$. The back surface 63$c$ is connected to the placement portion 61. The side surface 63$d$ is located at an end of the wall 63 in the counterclockwise direction Dha. The side surface 63$d$ is formed substantially flat and faces in the counterclockwise direction Dha. A corner portion 63$e$ between the back surface 63$c$ and the side surface 63$d$ is chamfered.

As shown in FIG. 6, the plurality of protrusions 64 protrude from the wall 63 toward the central axis Axh substantially in parallel. The plurality of protrusions 64 are arranged with a gap in the axial direction. The number of the protrusions 64 is equal to the number of the magnetic disks 12.

Each of the plurality of protrusions 64 supports the two HGA 36 at the unloading position Pu. That is, one of the surfaces of the protrusion 64 supports one HGA 36 corresponding to one surface 12*a* of the magnetic disk 12. The other surface of the protrusion 64 supports another HGA 36 corresponding to the other surface 12*a* of the magnetic disk 12.

The plurality of protrusions 64 are formed in a block shape or a plate shape extending in the circumferential direction of the central axis Axh, for example. The plurality of protrusions 64 have substantially the same shape. The shape of the plurality of protrusions 64 is not limited to this example. Each of the plurality of protrusions 64 includes a first support portion 71, a second support portion 72, and a limiter 73. The limiter 73 may also be referred to as a slider limiter.

The first support portion 71 is a part of the protrusion 64 projecting from the first surface 63*a*. The first support portion 71 has two flat surfaces 71*a* and 71*b*, two inclined surfaces 71*c* and 71*d*, an end surface 71*e*, and a side surface 71*f*. The first support portion 71 is not limited to this example. The end surface 71*e* is an example of an edge of the first support portion.

The flat surfaces 71*a* and 71*b* are planes substantially orthogonal to the Z direction and face substantially the same direction. The flat surface 71*a* is more distant from the surfaces 12*a* of the magnetic disks 12 than the flat surface 71*b* in the Z direction. The flat surface 71*b* is more distant from the central axes Axd of the magnetic disks 12 than the flat surface 71*a*.

The inclined surface 71*c* extends obliquely with respect to the flat surface 71*a* between the end of the first support portion 71 in the counterclockwise direction Dha and the flat surface 71*a*. The inclined surfaces 71*c* extend from the flat surfaces 71*a* toward the corresponding surfaces 12*a* of the magnetic disks 12. The inclined surface 71*d* extends between the two flat surfaces 71*a* and 71*b*.

The end surface 71*e* is located at an end of the first support portion 71 in the inward direction Dri. The end surface 71*e* faces the central axis Axh when the ramp load mechanism 16 is at the first position P1. The end surface 71*e* extends around the central axis Axh when the ramp load mechanism 16 is at the first position P1. Therefore, when the ramp load mechanism 16 is located at the first position P1, the first support portion 71 extends around the central axis Axh as a whole.

When the ramp load mechanism 16 is at the first position P1, the end surface 71*e* is more distant from the central axis Axh of the HSA 14 than the slider 48. That is, the end surface 71*e* is located outside the range in which the slider 48 rotates when the ramp load mechanism 16 is located at the first position P1.

On the other hand, when the ramp load mechanism 16 is at the first position P1, the end surface 71*e* is closer to the central axis Axh of the HSA 14 than at least a part of the lift tab 46*a*. That is, the first support portion 71 is located on the track on which the lift tab 46*a* rotates when the ramp load mechanism 16 is at the first position P1.

As shown in FIG. 2, the side surface 71*f* is located at an end of the first support portion 71 in the counterclockwise direction Dha. The side surface 71*f* is formed substantially flat and faces in the counterclockwise direction Dha. The side surface 71*f* of the first support portion 71 is continuous with the side surface 63*d* of the wall 63.

The second support portion 72 is a part of the protrusion 64 projecting from the second surface 63*b*. Therefore, the second support portion 72 is more distant from the central axis Axd of the magnetic disk 12 than the first support portion 71.

As shown in FIG. 6, the second support portion 72 has a flat surface 72*a*, an inclined surface 72*b*, and an end surface 72*c*. The second support portion 72 is not limited to this example. The end surface 72*c* is an example of an edge of the second support portion.

The flat surface 72*a* is connected to the end of the flat surface 71*b* of the first support portion 71 in the clockwise direction Dhc and is continuous with the flat surface 71*b*. That is, the flat surface 71*b* of the first support portion 71 and the flat surface 72*a* of the second support portion 72 form one plane.

An end of the inclined surface 72*b* in the counterclockwise direction Dha is connected to an end of the flat surface 72*a*. In the Z direction, the end of the inclined surface 72*b* in the clockwise direction Dhc is closer to the surface 12*a* of the magnetic disk 12 than the flat surface 72*a*.

The end surface 72*c* is located at an end of the second support portion 72 in the inward direction Dri. The end surface 72*c* faces the central axis Axh when the ramp load mechanism 16 is at the second position P2. The end surface 72*c* extends around the central axis Axh when the ramp load mechanism 16 is at the second position P2. Therefore, when the ramp load mechanism 16 is located at the second position P2, the second support portion 72 extends around the central axis Axh as a whole.

When the ramp load mechanism 16 is at the second position P2, the end surface 72*c* is spaced apart from the central axis Axh of the HSA 14 more than the slider 48. That is, the end surface 72*c* is located outside the range in which the slider 48 rotates when the ramp load mechanism 16 is at the second position P2.

On the other hand, when the ramp load mechanism 16 is at the second position P2, the end surface 72*c* is closer to the central axis Axh of the HSA 14 than at least a part of the lift tab 46*a*. That is, the second support portion 72 is located on the track on which the lift tab 46*a* rotates when the ramp load mechanism 16 is at the second position P2.

As schematically shown in FIG. 3, an angle θ2 between the end surface 71*e* of the first support portion 71 and the end surface 72*c* of the second support portion 72 is larger than 90° and smaller than 180°. The angle θ2 is not limited to this example. When the end surfaces 71*e* and 72*c* have an arc shape, the angle θ2 is an angle between a tangent line at the center of the end surface 71*e* around the central axis Axh and a tangent line at the center of the end surface 72*c* around the central axis Axh.

As shown in FIG. 6, the limiter 73 protrudes in the inward direction Dri from the end surface 71*e* of the first support portion 71 and the end surface 72*c* of the second support portion 72. For example, the limiter 73 is positioned at substantially the center of the protrusion 64 in the Z direction. The limiter 73 is formed in a thin plate shape extending in the circumferential direction of the central axis Axh.

The limiter 73 is provided in substantially the entire region of the second support portion 72 in the circumferential direction of the central shaft Axh, and is provided in a portion of the first support portion 71 having the flat surface 71*b*. The limiter 73 is not limited to this example.

Each of the plurality of protrusions 64 is provided with a notch 75. The notch 75 is provided at an end portion of the protrusion 64 in the counterclockwise direction Dha. That is, the notch 75 is provided in the first support portion 71. The notch 75 may be provided over the protrusion 64 and the wall 63.

When the ramp load mechanism 16 is in the first position P1, a part of the magnetic disk 12 is disposed in the notch 75. Therefore, as shown in FIG. 2, when the ramp load mechanism 16 is in the first position P1, a part of the ramp load mechanism 16 covers the magnetic disks 12 in the axial direction.

As shown in FIG. 6, when the ramp load mechanism 16 is in the second position P2, the magnetic disks 12 are located outside the notch 75. As shown in FIG. 5, when the ramp load mechanism 16 is in the second position P2, the ramp load mechanism 16 is spaced apart from the magnetic disks 12 in the radial direction.

As shown in FIGS. 2 and 5, the first support portion 71 when the ramp load mechanism 16 is at the first position P1 is closer to the end 26*c* of the inner peripheral surface 26*a* than the first support portion 71 when the ramp load mechanism 16 is at the second position P2. That is, when the ramp load mechanism 16 rotates from the first position P1 to the second position P2, the first support portion 71 is separated from the end 26*c* of the inner peripheral surface 26*a*.

As shown in FIG. 5, when the ramp load mechanism 16 is in the second position P2, the side surface 63*d* of the wall 63 and the side surface 71*f* of the first support portion 71 face the outer edge 12*b* of the magnetic disk 12. When the ramp load mechanism 16 is in the second position P2, the corner portion 63*e* of the wall 63 may face the outer edge 12*b* of the magnetic disk 12.

As shown hypothetically by the two-dot chain line in FIG. 5, the HDD 10 further includes a screw 81. The screw 81 passes through the through hole 65 of the placement portion 61 and can be fitted into the screw hole 56 of the base 51 when the ramp load mechanism 16 is at any of the first position P1 and the second position P2. Thus, the screw 81 fixes the ramp load mechanism 16 to the housing 11.

The position of the through hole 65 when the ramp load mechanism 16 is at the first position P1 and the position of the through hole 65 when the ramp load mechanism 16 is at the second position P2 are different from each other. However, the diameter of the through hole 65 is larger than the diameter of the screw hole 56. Therefore, the through hole 65 aligns with the screw hole 56 when the ramp load mechanism 16 is at any of the first position P1 and the second position P2.

The screw 81 fastens the placement portion 61 of the ramp load mechanism 16 to the base 51, thereby fixing the ramp load mechanism 16 to the housing 11. That is, the placement portion 61 is held between the placement surface 51*a* of the base 51 and the screw heads of the screws 81. This can prevent the ramp load mechanism 16 from undesirably moving around the central axis Axr.

During operation of the HDD 10, the ramp load mechanism 16 is in the first position P1 and is fixed by the screws 81. As shown in FIG. 3, when the ramp load mechanism 16 is at the first position P1, the first support portion 71 supports the lift tab 46*a* that moves between the load position Pl and the unload position Pu.

For example, when the HSA 14 is located at the load position Pl, the slider 48 is located on the surface 12*a* of the magnetic disk 12, and the lift tab 46*a* is spaced from the protrusion 64. The HSA 14 rotates in the clockwise direction Dhc when moving from the load position Pl to the unload position Pu.

When the HSA 14 rotates in the clockwise direction Dhc, the lift tab 46*a* abuts against the inclined surface 71*c* of the first support portion 71. When the HSA 14 further rotates in the clockwise direction Dhc, the lift tab 46*a* moves along the inclined surface 71*c* and separates from the surface 12*a* of the magnetic disk 12 in the axial direction.

When the lift tab 46*a* is separated from the surface 12*a* of the magnetic disk 12 by a predetermined distance in the axial direction, the slider 48 is also separated from the surface 12*a* of the magnetic disk 12 in the axial direction. That is, the slider 48 is peeled off from the surface 12*a* of the magnetic disk 12. Before the lift tab 46*a* reaches the flat surface 71*a*, the slider 48 is separated from the surface 12*a* of the magnetic disk 12.

As the HSA 14 further rotates in the clockwise direction Dhc, the lift tab 46*a* is sequentially supported by the flat surface 71*a*, the inclined surface 71*d*, and the flat surface 71*b*. The HSA 14 stops rotating when the lift tab 46*a* reaches the end of the flat surface 71*b* (unload position Pu) in the clockwise direction Dhc. The unloading position Pu may also be referred to as a home position.

As shown in FIG. 6, when the HSA 14 is at the unload position Pu, the limiter 73 is positioned between the two gimbals 47*a*. For example, when the HGA 36 vibrates in the Z direction due to an external force, the two sliders 48 may approach each other. The limiter 73 can prevent the two sliders 48 from interfering with each other by abutting on the two gimbals 47*a*.

For example, the magnetic disks 12 may be replaced in HDD 10 repair (or rework). In the rework of the present embodiment, the ramp load mechanism 16 is moved from the first position P1 to the second position P2. For example, the screw 81 is loosened, and the ramp load mechanism 16 is moved from the first position P1 to the second position P2 around the central axis Axr. The ramp load mechanism 16 is fixed to the second position P2 by the screw 81.

When the ramp load mechanism 16 is at the first position P1, the second surface 63*b* is positioned on the track of the lift tab 46*a*, and the second support portion 72 is positioned on the track of the slider 48. Therefore, the second surface 63*b* can interfere with the lift tab 46*a*, and the second support portion 72 can interfere with the slider 48. However, when the ramp load mechanism 16 moves to the second position P2, the HSA 14 can further rotate in the clockwise direction Dhc from the unload position Pu.

As shown in FIG. 3, when the ramp load mechanism 16 is in the second position P2, the HSA 14 can move between the unloading position Pu and the retracted position Pa around the central axis Axh. At the retracted position Pa, the HSA 14 is spaced apart from the magnetic disks 12 in the radial direction from the central axis Axd. That is, at the retracted position Pa, neither the HGA 36 nor the arm 42 covers the magnetic disks 12.

The HSA 14 rotates in the clockwise direction Dhc when moving from the unloading position Pu to the retracted position Pa. The flat surface 71*b* of the first support portion 71 and the flat surface 72*a* of the second support portion 72, which are continuous with each other, support the lift tab 46*a* that rotates in the clockwise direction Dhc.

The HSA 14 stops rotating when the lift tab 46*a* reaches the end portion of the flat surface 72*a* (the retracted position Pa) in the clockwise direction Dhc. As described above, when the ramp load mechanism 16 is in the second position P2, the second support portion 72 supports the lift tab 46*a* that moves between the unload position Pu and the retracted position Pa.

When the ramp load mechanism 16 is in the second position P2 and the HSA 14 is in the retracted position Pa, the magnetic disks 12 are not covered by either the HSA 14 or the ramp load mechanism 16. Therefore, the magnetic disk 12 is movable in the axial direction and is removed from the housing 11.

Further, a new magnetic disk 12 is attached to the housing 11. The HSA 14 at the retracted position Pa and the ramp load mechanism 16 at the second position P2 can be prevented from interfering with the magnetic disks 12 attached to the housing 11.

When a new magnetic disk 12 is attached to the housing 11, the HSA 14 is rotated from the retracted position Pa to the unload position Pu. After the HSA 14 is moved to the unloading position Pu, the screw 81 is loosened, and the ramp load mechanism 16 is rotated from the second position P2 to the first position P1. The ramp load mechanism 16 is fixed to the first position P1 by the screw 81, and the replacement of the magnetic disks 12 is completed.

When the ramp load mechanism 16 is at the second position P2, the first surface 63*a* is positioned on the track of the lift tab 46*a*, and the first support portion 71 is positioned on the track of the slider 48. Therefore, the first surface 63*a* can interfere with the lift tab 46*a*, and the first support portion 71 can interfere with the slider 48. However, when the ramp load mechanism 16 moves to the first position P1, the HSA 14 can rotate from the unload position Pu to the load position Pl.

When the HDD 10 is assembled, the magnetic disks 12 are first attached to the housing 11. Next, the ramp load mechanism 16 is attached to the housing 11 so as to be disposed at the second position P2.

Next, the HSA 14 is attached to the support shaft 31 of the housing 11 so as to be separated from the ramp load mechanism 16 in the clockwise direction Dhc. When the HSA 14 is rotated in the counterclockwise direction Dha, the lift tab 46*a* abuts against the inclined surface 72*b* of the second support portion 72. When the HSA 14 further rotates in the counterclockwise direction Dha, the lift tab 46*a* moves along the inclined surface 72*b* and the flat surface 72*a* and reaches the unloading position Pu.

Next, the ramp load mechanism 16 is rotated from the second position P2 to the first position P1. Further, the ramp load mechanism 16 is fixed to the first position P1 by the screw 81. Thus, the HSA 14 is movable between the loading position Pl and the unloading position Pu.

The assembly of the HDD 10 is not limited to the above example. For example, the ramp load mechanism 16 may be attached to the housing 11 so as to be located at the second position P2 before the magnetic disks 12. Since the ramp load mechanism 16 is in the second position P2, the magnetic disks 12 can be mounted on the housing 11 without interfering with the ramp load mechanism 16.

As shown in FIG. 3, the HDD 10 further includes a stopper 91. The stopper 91 is, for example, removably attached to the housing 11 or the VCM 15. The stopper 91 restricts the HSA 14 from rotating from the unloading position Pu toward the retracted position Pa by abutting against the carriage 35 of the HSA 14 at the unloading position Pu.

The stopper 91 can prevent the second surface 63*b* at the first position P1 from interfering with the lift tab 46*a* and prevent the second support portion 72 at the first position P1 from interfering with the slider 48. In the rework process, the stopper 91 can be removed from the housing 11 or the VCM 15 after the ramp load mechanism 16 rotates from the first position P1 to the second position P2.

In the HDD 10 according to the first embodiment described above, the magnetic disks 12 are rotatable around the central axis Axd. The ramp load mechanism 16 is rotatable around the center shaft Axr between a first position P1 and a second position P2. At the first position P1, the ramp load mechanism 16 covers the magnetic disks 12 in the axial direction along the central axis Axd. At the second position P2, the ramp load mechanism 16 is separated from the magnetic disks 12 in the radial direction perpendicular to the central axis Axd. The HSA 14 is rotatable around the central shaft Axh, and has a slider 48 and a lift tab 46*a*. The slider 48 is configured to read and write information from and to the magnetic disk 12. The lift tab 46*a* is more distant from the central axis Axh than the slider 48. The housing 11 accommodates the magnetic disks 12, the ramp load mechanism 16, and the HSA 14.

The HSA 14 is movable around the central axis Axh to a loading position Pl, an unloading position Pu, and a retracted position Pa. At the load position Pl, the slider 48 is positioned above the magnetic disk 12. At the unload position Pu, the HSA 14 covers the magnetic disk 12 in the axial direction, and the slider 48 is separated from the magnetic disk 12. At the retracted position Pa, the HSA 14 is radially spaced apart from the magnetic disk 12.

The ramp load mechanism 16 includes a first support portion 71 and a second support portion 72. The first support portion 71 is configured to support the lift tab 46*a* which moves between the load position Pl and the unload position Pu when the ramp load mechanism 16 is at the first position P1. The second support portion 72 is configured to support the lift tab 46*a* that moves between the unload position Pu and the retracted position Pa when the ramp load mechanism 16 is at the second position P2. The first position P1 is spaced apart from the second position P2 in a first circumferential direction Dc1 around the central axis Axr. The housing 11 has a first abutment surface 52*a* configured to abut the ramp load mechanism 16 at the first position P1 to restrict the ramp load mechanism 16 from rotating in the first circumferential direction Dc1.

When the ramp load mechanism 16 is in the second position P2 and the HSA 14 is in the retracted position Pa, the magnetic disks 12 are not covered by either the ramp load mechanism 16 or the HSA 14 and can move in the axial direction with respect to the housing 11. Therefore, in the HDD 10, the magnetic disks 12 can be attached to and detached from the housing 11 without detaching the ramp load mechanism 16 and the HSA 14 from the housing 11. Therefore, the HDD 10 can reduce the cost of rework.

The ramp load mechanism 16 abuts on the first abutment surface 52*a* by rotating from the second position P2 to the first position P1 after rework, for example. The first abutment surface 52*a* restricts the ramp load mechanism 16 from rotating beyond the first position P1. Thus, the HDD 10 can more accurately and more easily place the ramp load mechanism 16 into the first position P1, which can reduce assembly and rework costs.

When the ramp load mechanism 16 is located at the first position P1, the lift tab 46*a*, when moving between the load position Pl and the unload position Pu, is guided by the first support portion 71. HDD 10 can avoid undesired collisions between the slider 48 and the magnetic disk 12 or the ramp load mechanism 16 during the movement between the unload position Pu and the load position Pl, for example, by more accurately positioning the ramp load mechanism 16 at the first position P1 by the first abutment surface 52*a*.

The housing 11 has an inner peripheral surface 26*a*. The inner peripheral surface 26*a* extends around the central axis Axd and faces an outer edge 12*b* which is an end of the magnetic disk 12 in the radial direction. The first support portion 71 when the ramp load mechanism 16 is at the first position P1 is closer to the inner peripheral surface 26*a* than the first support portion 71 when the ramp load mechanism 16 is at the second position P2. That is, the ramp load mechanism 16 is separated from the inner peripheral surface 26*a* by rotating from the first position P1 to the second position P2. Therefore, as compared with the case where the ramp load mechanism 16 rotates in the reverse direction, the HDD 10 does not need to provide a space for the ramp load mechanism 16 to enter by reducing the inner peripheral surface 26*a*, and the inner peripheral surface 26*a* for rectifying the airflow generated by the rotating the magnetic disk 12 can be increased.

The first support portion 71 extends around the central axis Axh when the ramp load mechanism 16 is located at the first position P1. The second support portion 72 extends around the central axis Axh when the ramp load mechanism 16 is located at the second position P2. That is, the first support portion 71 and the second support portion 72 each extend in a substantially arc shape along the track of the lift tab 46*a*.

Therefore, the magnetic disk 12 can avoid the ramp load mechanism 16 from having to be larger, as compared with the case where the first support portion 71 and the second support portion 72 extend in a rectangular shape.

The ramp load mechanism 16 has a first surface 63*a* and a second surface 63*b*. When the ramp load mechanism 16 is at the first position P1, the first surface 63*a* faces the central axis Axh and is spaced apart from the central axis Axh more than the lift tab 46*a*. When the ramp load mechanism 16 is at the second position P2, the second surface 63*b* faces the central axis Axh and is spaced apart from the central axis Axh more than the lift tab 46*a*. The first support portion 71 protrudes from the first surface 63*a* and is spaced apart from the central axis Axh more than the slider 48 when the ramp load mechanism 16 is located at the first position P1. The second support portion 72 protrudes from the second surface 63*b* and is spaced apart from the central axis Axh more than the slider 48 when the ramp load mechanism 16 is located at the second position P2. Therefore, the first surface 63*a* and the first support portion 71 can be prevented from interfering with the lift tab 46*a* and the slider 48 which move between the load position Pl and the unload position Pu. In addition, the second surface 63*b* and the second support portion 72 can be prevented from interfering with the lift tab 46*a* and the slider 48 which move between the unload position Pu and the retracted position Pa.

An angle θ2 between an end surface 71*e* of the first support portion 71 facing the central axis Axh when the ramp load mechanism 16 is at the first position P1 and an end surface 72*c* of the second support portion 72 facing the central axis Axh when the ramp load mechanism 16 is at the second position P2 is larger than 90° and smaller than 180°. Therefore, the magnetic disk 12 can avoid having the ramp load mechanism 16 have to become larger, as compared with the case where the angle θ2 between the end surface 71*e* of the first support portion 71 and the end surface 72*c* of the second support portion 72 is 180° and the first support portion 71 and the second support portion 72 spread in a rectangular shape.

The housing 11 has a second abutment surface 53*a* configured to abut the ramp load mechanism 16 in the second position P2 to restrict the ramp load mechanism 16 from rotating in a second circumferential direction Dc2 opposite to the first circumferential direction Dc1. For example, the operator can confirm that the ramp load mechanism 16 has reached the second position P2 and has been separated from the magnetic disks 12 in the radial direction by the ramp load mechanism 16 abutting against the second abutment surface 53*a*. Therefore, the HDD 10 can prevent the magnetic disks 12, which are attached or detached in the axial direction, from interfering with the ramp load mechanism 16 between the first position P1 and the second position P2.

The first abutment surface 52*a* has a lower roughness than the second abutment surface 53*a*. Therefore, the first abutment surface 52*a* can position the ramp load mechanism 16 more accurately than the second abutment surface 53*a*.

The HDD 10 can avoid undesired collisions between the slider 48 and the magnetic disks 12 or the ramp load mechanism 16 during the movement between the unload position Pu and the load position Pl, for example, by more accurately positioning the ramp load mechanism 16 at the first position P1 by the first abutment surface 52*a*. Also, the second abutment surface 53*a* does not need to be accurately machined, for example, by fine machining processes. That is, the HDD 10 can reduce the manufacturing costs associated with processing the second abutment surface 53*a*.

The housing 11 is provided with a screw hole 56 for a screw 81. A through hole 65 is provided in the ramp load mechanism 16. The through hole 65 is configured to align with the screw hole 56 when the ramp load mechanism 16 is at any of the first position P1 and the second position P2. The screw 81 is configured to fit into the screw hole 56 through the through hole 65 and fix the ramp load mechanism 16 to the housing 11 when the ramp load mechanism 16 is in any of the first position P1 and the second position P2. Thus, the HDD 10 can avoid an increase in the number of screw holes 56 provided in the housing 11. The screw 81 is not completely removed from the screw hole 56 but is loosened, thereby allowing the ramp load mechanism 16 to rotate between the first position P1 and the second position P2. Therefore, the HDD 10 can reduce the cost of rework.

The stopper 91 abuts on the HSA 14 at the unload position Pu to restrict the HSA 14 from rotating from the unload position Pu toward the retracted position Pa. Thus, the HDD 10 can avoid the HSA 14 rotating from the unload position Pu toward the retreat position Pa from interfering with the ramp load mechanism 16 located at the first position P1.

Second Embodiment

The second embodiment will be described below with reference to FIG. 7. In the following description of the embodiments, components having the same functions as those of the components described above are denoted by the same reference numerals as those of the components described above, and the description thereof may be omitted. Further, the plurality of components denoted by the same reference numerals do not necessarily have the same functions and properties, and may have different functions and properties according to each embodiment.

Figure 7:
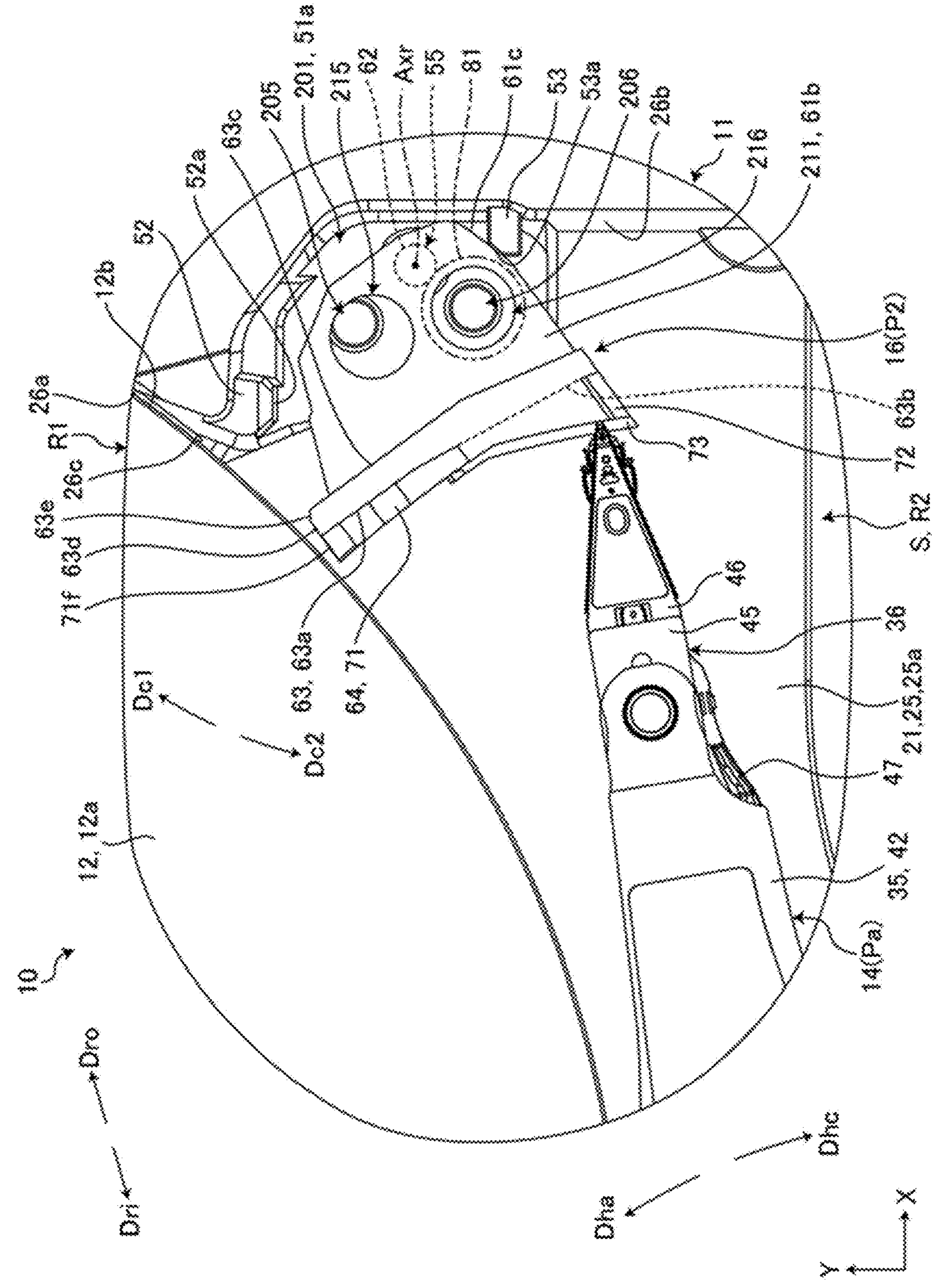
FIG. 7 is an exemplary plan view showing a part of a HDD according to a second embodiment.

FIG. 7 is an exemplary plan view showing a part of the HDD 10 according to the second embodiment. As shown in FIG. 7, the base 21 of the second embodiment has a base 201 instead of the base 51. The base 201 is substantially identical to the base 51, except as described below.

Instead of the screw hole 56, a first screw hole 205 and a second screw hole 206 are provided in the base 201. The first screw hole 205 and the second screw hole 206 are spaced apart from each other around the central axis Axr and are also spaced apart from the attachment hole 55. The first screw hole 205 and the second screw hole 206 are opened in the placement surface 51*a* of the base 201 and are provided with female screws.

The ramp load mechanism 16 of the second embodiment includes a placement portion 211 instead of the placement portion 61. The placement portion 211 is substantially the same as the placement portion 61 except for the points described below. The placement portion 211 is provided with a first through hole 215 and a second through hole 216 instead of the through hole 65.

The first through hole 215 and the second through hole 216 penetrate the placement portion 211 substantially in the Z direction and are opened in the lower surface 61*a* and the upper surface 61*b* of the placement portion 211. In the present embodiment, the cross sections of the first through hole 215 and the second through hole 216 orthogonal to the axial direction are formed in a substantially circular shape. The first through hole 215 and the second through hole 216 are spaced apart from each other around the central axis Axr.

When the ramp load mechanism 16 is located at the first position P1, the first through hole 215 aligns with the first screw hole 205. The diameter of the first through hole 215 is equal to or larger than the outer diameter of the first screw hole 205.

When the ramp load mechanism 16 is located at the second position P2, the second through hole 216 aligns with the second screw hole 206. The diameter of the second through hole 216 is equal to or larger than the outer diameter of the second screw hole 206.

When the ramp load mechanism 16 is located at the first position P1, the screw 81 can be fitted into the first screw hole 205 through the first through hole 215 and thus fixes the ramp load mechanism 16 to the housing 11. On the other hand, when the ramp load mechanism 16 is located at the second position P2, the screw 81 can be fitted into the second screw hole 206 through the second through hole 216, and thus fixes the ramp load mechanism 16 to the housing 11. Instead of the screws 81, jigs such as pins may be used to fix the ramp load mechanism 16 to the second position P2.

In the HDD 10 of the second embodiment described above, the first screw hole 205 and the second screw hole 206 are provided in the housing 11. The first screw hole 205 is configured to fit a screw 81. The second screw hole 206 is spaced apart from the first screw hole 205 around the central axis Axr and is also configured to fit a screw 81. A first through hole 215 and a second through hole 216 are provided in the ramp load mechanism 16. The first through hole 215 is configured to align with the first screw hole 205 when the ramp load mechanism 16 is in the first position P1. The second through hole 216 is configured to align with the second screw hole 206 when the ramp load mechanism 16 is at the second position P2. The screw 81 is configured to pass through the first through hole 215 and fit into the first screw hole 205 when the ramp load mechanism 16 is in the first position P1, and to pass through the second through hole 216 and fit into the second screw hole 206 when the ramp load mechanism 16 is in the second position P2, thereby fixing the ramp load mechanism 16 to the housing 11. Therefore, the diameters of the first through hole 215 and the second through hole 216 can be reduced, and the ramp load mechanism 16 can be prevented from being displaced from the first position P1 and the second position P2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. These embodiments and modifications thereof are included in the scope and spirit of the invention, and are included in the invention described in the claims and the scope of equivalents thereof.

What is claimed is:

1. A disk device, comprising:

a magnetic disk rotatable about a first rotation axis;

a ramp rotatable about a second rotation axis between a first position and a second position, the ramp covering a portion of the magnetic disk when at the first position and spaced from the magnetic disk in a radial direction orthogonal to the first rotation axis when at the second position;

a head stack assembly including:

a slider rotatable about a third rotation axis and configured to read and write information from and to the magnetic disk, and a lift tab spaced further from the third rotation axis than the slider; and a housing that houses the magnetic disk, the ramp, and the head stack assembly, wherein the head stack assembly is movable about the third rotation axis to:

a load position at which the slider is located above the magnetic disk, an unload position at which the head stack assembly covers the magnetic disk and the slider is spaced from the magnetic disk, and a retracted position at which the head stack assembly is spaced from the magnetic disk in the radial direction, the ramp includes:

a first support portion configured to support the lift tab when the ramp is at the first position, and a second support portion that is farther from the first rotation axis than the first support portion and is configured to support the lift tab when the ramp is at the second position, and the first position is spaced apart from the second position in a first circumferential direction about the second rotation axis, the housing includes a first abutment portion configured to abut the ramp at the first position to restrict rotation of the ramp in the first circumferential direction, the housing has an inner peripheral surface extending around the first rotation axis and facing an outer edge of the magnetic disk in the radial direction from the first rotation axis, and when the ramp is at the first position, the first support portion is closer to the inner peripheral surface than when the ramp is at the second position.

2. The disk device according to claim 1, wherein the lift tab moves between the load position and the unload position when the ramp is at the first position.

3. The disk device according to claim 2, wherein the lift tab moves between the unload position and the retracted position when the ramp is at the second position.

4. The disk device according to claim 1, wherein the first support portion extends around the third rotation axis when the ramp is at the first position, and the second support portion extends around the third rotation axis when the ramp is at the second position.

5. The disk device according to claim 1, wherein the ramp has:

a first surface that faces toward the third rotation axis when the ramp is at the first position, the first surface being farther from the third rotation axis than is the lift tab, and a second surface that faces toward the third rotation axis when the ramp is at the second position, the second surface being farther from the third rotation axis than the lift tab.

6. The disk device according to claim 5, wherein the first support portion protrudes from the first surface, when the ramp is located at the first position, the first support portion is spaced apart from the third rotation axis by more than is the slider, the second support portion protrudes from the second surface, and when the ramp is located at the second position, the second support portion is spaced apart from the third rotation axis by more than is the slider.

7. The disk device according to claim 1, wherein an angle between an edge of the first support portion facing the third rotation axis when the ramp is at the first position and an edge of the second support portion facing the third rotation axis when the ramp is at the second position is greater than 90° but less than 180°.

8. The disk device according to claim 1, wherein the housing further includes:

a second abutment portion configured to abut the ramp at the second position to restrict the ramp from rotating in a second circumferential direction opposite to the first circumferential direction.

9. The disk device according to claim 8, wherein the first abutment portion has a surface roughness that is less than that of the second abutment portion.

10. The disk device according to claim 1, wherein the housing has a screw hole into which a screw can be fitted, and the ramp is provided with a through hole configured to align with the screw hole when the ramp is located at the first position or the second position.

11. The disk device according to claim 10, wherein the screw fixes the ramp to the housing when fitted into the screw hole through the through hole.

12. The disk device according to claim 1, wherein the housing has a first screw hole and a second screw hole spaced apart from the first screw hole in a circumferential direction about the second rotation axis, and the ramp has a first through hole configured to align with the first screw hole when the ramp is located at the first position and a second through hole configured to align with the second screw hole when the ramp is located at the second position.

13. The disk device according to claim 12, wherein the ramp is fixed to the housing when the screw is fitted in the first screw hole or the second screw hole.

14. The disk device according to claim 1, further comprising:

a removably attachable stopper configured to abut the head stack assembly at the unload position to restrict the head stack assembly from rotating from the unload position toward the retracted position when attached.

15. A disk device, comprising:

a magnetic disk rotatable about a first rotation axis;

a ramp rotatable about a second rotation axis between a first position and a second position, the ramp covering a portion of the magnetic disk when at the first position and spaced from the magnetic disk in a radial direction orthogonal to the first rotation axis when at the second position;

a head stack assembly including:

a slider rotatable about a third rotation axis and configured to read and write information from and to the magnetic disk, and a lift tab spaced further from the third rotation axis than the slider; and a housing that houses the magnetic disk, the ramp, and the head stack assembly, wherein the head stack assembly is movable about the third rotation axis to:

a load position at which the slider is located above the magnetic disk, an unload position at which the head stack assembly covers the magnetic disk and the slider is spaced from the magnetic disk, and a retracted position at which the head stack assembly is spaced from the magnetic disk in the radial direction, the ramp includes:

a first support portion configured to support the lift tab when the ramp is at the first position, and a second support portion that is farther from the first rotation axis than the first support portion and is configured to support the lift tab when the ramp is at the second position, and the first position is spaced apart from the second position in a first circumferential direction about the second rotation axis, the housing includes a first abutment portion configured to abut the ramp at the first position to restrict rotation of the ramp in the first circumferential direction, the housing further includes:

a second abutment portion configured to abut the ramp at the second position to restrict the ramp from rotating in a second circumferential direction opposite to the first circumferential direction, and the first abutment portion has a surface roughness that is less than that of the second abutment portion.

16. A disk device, comprising:

a magnetic disk rotatable about a first rotation axis;

a ramp rotatable about a second rotation axis between a first position and a second position, the ramp covering a portion of the magnetic disk when at the first position and spaced from the magnetic disk in a radial direction orthogonal to the first rotation axis when at the second position;

a head stack assembly including:

a slider rotatable about a third rotation axis and configured to read and write information from and to the magnetic disk, and a lift tab spaced further from the third rotation axis than the slider; and a housing that houses the magnetic disk, the ramp, and the head stack assembly, wherein the head stack assembly is movable about the third rotation axis to:

a load position at which the slider is located above the magnetic disk, an unload position at which the head stack assembly covers the magnetic disk and the slider is spaced from the magnetic disk, and a retracted position at which the head stack assembly is spaced from the magnetic disk in the radial direction, the ramp includes:

a first support portion configured to support the lift tab when the ramp is at the first position, and a second support portion that is farther from the first rotation axis than the first support portion and is configured to support the lift tab when the ramp is at the second position, and the first position is spaced apart from the second position in a first circumferential direction about the second rotation axis, the housing includes a first abutment portion configured to abut the ramp at the first position to restrict rotation of the ramp in the first circumferential direction, the housing has a first screw hole and a second screw hole spaced apart from the first screw hole in a circumferential direction about the second rotation axis, and the ramp has a first through hole configured to align with the first screw hole when the ramp is located at the first position and a second through hole configured to align with the second screw hole when the ramp is located at the second position.

17. The disk device according to claim 16, wherein the ramp is fixed to the housing when the screw is fitted in the first screw hole or the second screw hole.

* * * * *